UNITED STATES PATENT OFFICE.

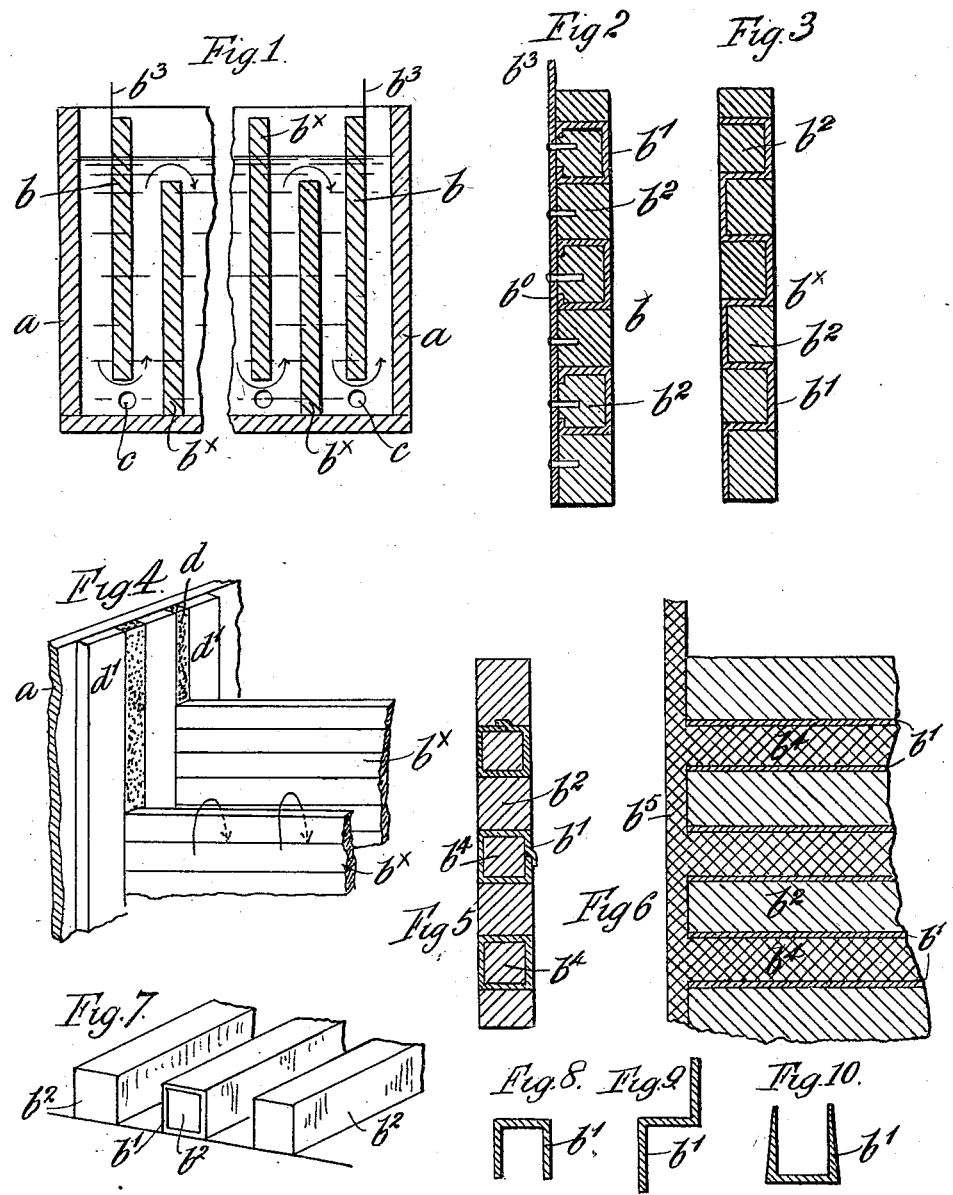

AUGUST ALFRED VOGELSANG, OF DRESDEN, GERMANY, ASSIGNOR, BY MESNE ASSIGNMENTS, TO WILLIAM LEWIN, OF NOTTINGHAM, ENGLAND.

ELECTROLYTIC CELL AND ELECTRODE THEREFOR.

SPECIFICATION forming part of Letters Patent No. 703,861, dated July 1, 1902.

Application filed March 5, 1901. Serial No. 49,876. (No model.)

*To all whom it may concern:*

Be it known that I, AUGUST ALFRED VOGELSANG, chemical engineer, a subject of the Emperor of Germany, residing at 54 (I) Rosenstrasse, Dresden, in the Empire of Germany, have invented certain new and useful Improvements in Electrolytic Cells and in Electrodes Therefor, of which the following is a specification.

This invention relates to electrolytic cells and to electrodes therefor, and has reference more particularly to cells for the electrolysis of brine and other alkaline chlorid-solutions.

The object of the invention is, primarily, to enable all-platinum electrodes to be used economically. I thus obviate the constant trouble and difficulty that arise where platinum is joined to a backing of base metal, owing to the impossibility of connecting them satisfactorily. The cell is so constructed that the electrolyte passes alternately up and down between the electrodes, the end ones of which only are used for the inflow and outflow of the current, while the intermediate ones have no connection whatever with the external circuit. These electrodes consist of a supporting-body in the form of a plate or slab built up or composed mainly of insulating material faced on each side with conducting-strips of platinum or other metal, which strips alternate with exposed portions or surfaces of the body of the electrode. A continuous or integral connection is formed between the strips on one face of the electrode and those on the other, thus obviating any joints below the surface of the electrolyte.

Referring to the accompanying drawings, Figure 1 is a section of one of the improved cells. Figs. 2 and 3 are sections, respectively, of one of the end electrodes and one of the intermediate ones. Fig. 4 illustrates a connient way of fixing the electrodes in place. Figs. 5 and 6 are transverse and longitudinal sections of the other forms of electrode. Fig. 7 is a perspective view showing how an electrode may be built up. Figs. 8, 9, and 10 are sections showing different forms in which the platinum may be employed.

Referring first to Figs. 1 to 4, $a$ is the outer cell, which is preferably of slate. $b$ represents the electrodes by which the current enters and leaves the cell, these being what may be termed the "electrodes proper," and $b^\times$ are intermediate electrodes which have no connection with the external circuit. The electrodes are arranged after the manner of baffle-plates, so that the electrolyte extends alternately over and under them from compartment to compartment, and hence if run in at one end and drawn off at the other will pursue an up-and-down course, as indicated by the arrows. Suitable draw-off holes $c$ are provided where necessary for the removal of sludge, &c. The electrodes $b^\times$ are in this case formed of a zigzag sheet of platinum-foil $b'$, fitting in between square rods $b^2$, of slate or other suitable insulating material, as shown in Fig. 3. The vertical portions of the platinum-foil form the conducting-strips above referred to and act as the electrolyzing surfaces, while the horizontal portions constitute the integral connections between said strips. This applies equally to the other figures, and it should be mentioned that the thickness of the platinum-foil is greatly exaggerated for the sake of clearness. The connection of the electrodes $b$ with the external circuit is made by a projecting tongue $b^3$ on a lead backing $b^0$. The intermediate electrodes $b^\times$ have no connecting-tongue, as they receive their current-supply through the liquid. The electrodes are secured in place in grooves $d$ between distance-strips $d'$, cemented to the sides of the cell, these grooves being filled up above and below the electrodes with Portland cement.

The action of the cell is as follows: The electrodes $b$ are connected to a circuit of, say, one hundred volts. Each compartment in the cell acts in series as a separate or subsidiary cell and takes its proper share in the fall of potential. Thus if there are ten compartments each will be subject to a difference of potential of ten volts. This feature has the great advantage that it enables the electrolysis to be carried on in a single cell with currents of only moderate quantity, and hence greatly simplifies the electrical arrangement. It will be obvious that the platinum strips on the left of each electrode act, say, as the anodes for one cell or compartment, while those on the right act as the cathodes for the next compartment, and that the solution flowing through the compartments is again and again subjected to the electrolytic action. A suitable current density to avoid overheating and yet obtain the best duty from the platinum is two amperes per square millimeter of section and fifty amperes per square decimeter of exposed surface. Acting on these data it is easy to calculate the proper depth and length which should be given to the exposed surfaces of the platinum in order to safely use foils even as thin, for instance, as .03 millimeters.

Referring now to Figs. 5 and 6, it will be seen that the platinum forms sheaths completely surrounding certain of the bars of which the electrode is built up. In the case of the end electrodes $b$ these sheaths inclose bars of lead $b^4$, connected with upright lead strips $b^5$, which serve as conductors and lead to the external circuit. In the case of the intermediate electrodes $b^\times$ the bars inside the sheaths are of the same insulating material as the other bars which compose the electrode. The main advantage of this latter construction is that it affords two horizontal conducting-surfaces for connecting the top and bottom edges of each pair of strips or electrolyzing-surfaces.

The manner in which the various electrodes are built up will be clear from an inspection of Fig. 7, which shows a platinum-sheathed bar between but separated from the neighboring insulated bars. In practice these bars are cemented together by a thin layer of Portland cement. In the construction shown in Figs. 2 and 3 the foil is bent to and fro between the bars while the latter are being packed side by side.

Figs. 8, 9, and 10 show modifications in the shape of the foil, which instead of forming a sheath may simply be of trough-like or Z section. In Fig. 10 the thickness of the electrolyzing-surfaces is reduced or tapered off gradually, thus saving platinum without, however, increasing the current density.

It will be obvious that the bars which form the body of the electrode may be of any suitable section, although the square form is considered most convenient.

What I claim, and desire to secure by Letters Patent of the United States, is—

1. In an electrode, the combination of a series of supporting-bars, electrode-strips covering the sides thereof, and conducting-strips integral with such electrode-strips and passing through said electrode between said bars, substantially as described.

2. In an electrode, the combination of a supporting-body composed of superposed bars of suitable material, conducting-strips on the faces of certain of said bars at opposite sides of the electrode, and means for electrically connecting said strips, substantially as described.

3. In an electrode, the combination of superposed bars of insulating material, electrode-strips held in position against the face of the electrode by said bars and conducting portions situated between said bars, substantially as described.

4. In an electrolytic cell, the combination of electrodes at each end thereof, electrode-strips on the face of said electrodes, means for connecting said strips with the external circuit, intermediate electrodes having corresponding electrode-strips on their opposite faces unconnected with the external circuit, means for connecting the electrode-strips upon such opposite faces, and means for holding said electrodes in place at different levels, substantially as described.

5. In an electrode for the purposes mentioned, the combination of superposed bars of suitable material and of approximately square section, conducting-sheaths around certain of said bars, and means for holding said bars together, substantially as described.

6. In an electrolytic cell, the combination of terminal electrodes built up of alternate insulating and conducting bars, the latter being sheathed in platinum-foil, intermediate electrodes formed of superposed insulating-bars only some of which are sheathed in platinum-foil, means for holding said bars together, and means for connecting the sheathings of the terminal electrodes with the external circuit, substantially as described.

7. In an electrolytic cell, the combination of an outer cell, distance-strips cemented to the sides of said cell, electrodes consisting of superposed bars fitted between said strips, platinum strips secured against opposite sides of said electrodes, and integral connecting portions extending between opposite strips and passing through the electrodes, substantially as described.

8. In an electrolytic cell, the combination of terminal electrodes each consisting of alternate insulating and leaden bars superposed on each other, the latter being sheathed in platinum, a lead backing forming an electrical connection between said leaden bars and the external circuit, intermediate electrodes each consisting of insulating-bars superposed on each other and alternately sheathed in platinum-foil, an outer cell containing said electrodes, distance-strips cemented inside said cell between said electrodes, and fillings of Portland cement in the grooves between said strips, substantially as described.

9. In an electrode, the combination of a series of bars sheathed with inert metal, a series of unsheathed bars alternating therewith, and means for securing said bars together, substantially as described.

10. In an electrolytic cell, the combination of an outer cell, distance-strips at the sides of said cell, and electrodes between said strips, each of said electrodes consisting of plain or unsheathed bars alternating with bars sheathed in metal, substantially as described.

In testimony whereof I have hereunto set my hand, in presence of two subscribing witnesses, this 19th day of February, 1901.

AUGUST ALFRED VOGELSANG.

Witnesses:
WM. H. JACON,
MARK SHAW.